US012559247B2

(12) United States Patent　　(10) Patent No.: US 12,559,247 B2
Seki et al.　　(45) Date of Patent: Feb. 24, 2026

(54) AIRCRAFT HYBRID MOTIVE POWER SOURCE SYSTEM AND METHOD FOR CONTROLLING SAME

(71) Applicant: IHI Corporation, Tokyo (JP)

(72) Inventors: Naoki Seki, Tokyo (JP); Hitoshi Oyori, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 19/016,563

(22) Filed: Jan. 10, 2025

(65) Prior Publication Data

US 2025/0145302 A1　　May 8, 2025

Related U.S. Application Data

(63) Continuation of application No. PCT/JP2023/025869, filed on Jul. 13, 2023.

(30) Foreign Application Priority Data

Jul. 21, 2022　(JP) .................................. 2022-116250

(51) Int. Cl.
　B64D 31/18　　(2024.01)
　B64D 27/10　　(2006.01)
　　　　(Continued)

(52) U.S. Cl.
　CPC ............. B64D 31/18 (2024.01); B64D 27/10 (2013.01); B64D 27/33 (2024.01); B64D 27/355 (2024.01)

(58) Field of Classification Search
　CPC ...... B64D 31/18; B64D 27/33; B64D 37/355; B64D 27/10; B64D 27/02; B64D 27/27
　See application file for complete search history.

(56) References Cited

U.S. PATENT DOCUMENTS 11,933,232　B1 *　3/2024　Schelfaut .................. F02C 6/00
2006/0138779　A1　6/2006　Bouiller et al.
　　　　(Continued)

FOREIGN PATENT DOCUMENTS

EP　　3 012 438 A1　4/2016
JP　　11-200888 A　7/1999
　　　　(Continued)

OTHER PUBLICATIONS

International Search Report issued Sep. 12, 2023 in PCT/JP2023/025869 filed on Jul. 13, 2023, 2 pages.

*Primary Examiner* — Rodney A Bonnette
(74) *Attorney, Agent, or Firm* — Oblon, McClelland, Maier & Neustadt, L.L.P.

(57) ABSTRACT

An aircraft hybrid motive power source system includes: a gas turbine engine mounted on an aircraft and including a low-pressure shaft and a high-pressure shaft as rotary shafts; a first motor generator drivingly connected to the high-pressure shaft; a second motor generator drivingly connected to the low-pressure shaft; a fuel cell to which a fuel gas and an oxidant gas are supplied; a fuel gas generator configured to generate the fuel gas from a raw material by heating using an exhaust gas from the gas turbine engine; and a controller configured to supply an electric power of the fuel cell obtained by a supply of the fuel gas to one of the first motor generator and the second motor generator, based on at least one of information indicating an operating status of the gas turbine engine and an electric power demand of the aircraft.

12 Claims, 5 Drawing Sheets

| 20 | engine |
| 21 | fan |
| 22 | low-pressure compressor |
| 23 | high-pressure compressor |
| 24 | combustion chamber |
| 25 | high-pressure turbine |
| 26 | low-pressure turbine |
| 27 | low-pressure shaft |
| 28 | high-pressure shaft |
| 31 | first motor generator |
| 32 | second motor generator |
| 33 | first drive train |
| 34 | second drive train |
| 35 | fuel tank |
| 36 | fuel supply device |
| 37 | raw material tank |
| 38 | raw material supply device |
| 40 | fuel cell |
| 50 | fuel gas generator |
| 51 | heat-medium channel |
| 52 | reaction channel |
| 55 | heat exchanger |
| 56 | air supplier |
| 57 | heating device |
| 60 | controller |
| 61 | electric power system |
| 62 | aircraft components |

(51) Int. Cl.
B64D 27/33 (2024.01)
B64D 27/355 (2024.01)

(56) References Cited

U.S. PATENT DOCUMENTS

| 2006/0254255 | A1 | | 11/2006 | Okai et al. | |
|---|---|---|---|---|---|
| 2018/0266329 | A1 | * | 9/2018 | Mackin | H02K 16/00 |
| 2019/0063321 | A1 | * | 2/2019 | Morioka | B64D 41/00 |
| 2020/0248619 | A1 | * | 8/2020 | Romero | F02C 9/18 |
| 2024/0254898 | A1 | * | 8/2024 | Terwilliger | F02C 3/305 |
| 2024/0343401 | A1 | * | 10/2024 | Miftakhov | H01M 8/04313 |

FOREIGN PATENT DOCUMENTS

| JP | 2006-153013 A | 6/2006 |
|---|---|---|
| JP | 2006-205755 A | 8/2006 |

\* cited by examiner

FIG. 1

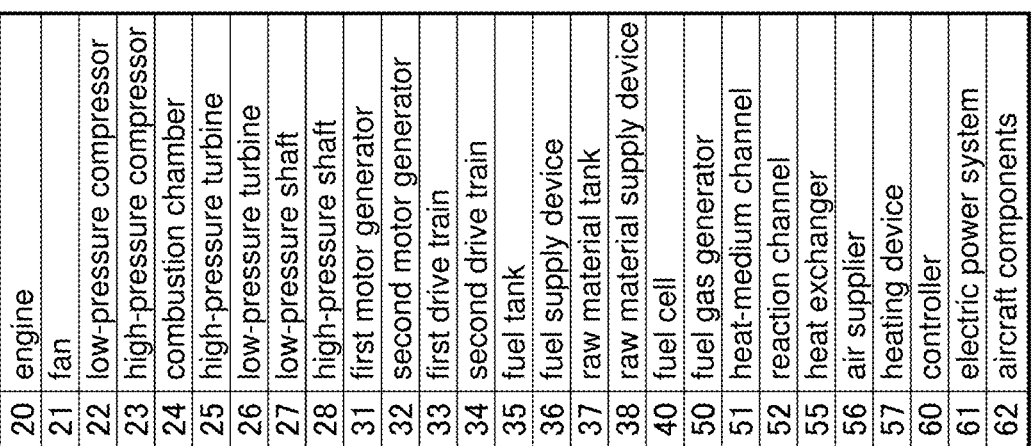

| 20 | engine |
|----|--------|
| 21 | fan |
| 22 | low-pressure compressor |
| 23 | high-pressure compressor |
| 24 | combustion chamber |
| 25 | high-pressure turbine |
| 26 | low-pressure turbine |
| 27 | low-pressure shaft |
| 28 | high-pressure shaft |
| 31 | first motor generator |
| 32 | second motor generator |
| 33 | first drive train |
| 34 | second drive train |
| 35 | fuel tank |
| 36 | fuel supply device |
| 37 | raw material tank |
| 38 | raw material supply device |
| 40 | fuel cell |
| 50 | fuel gas generator |
| 51 | heat-medium channel |
| 52 | reaction channel |
| 55 | heat exchanger |
| 56 | air supplier |
| 57 | heating device |
| 60 | controller |
| 61 | electric power system |
| 62 | aircraft components |

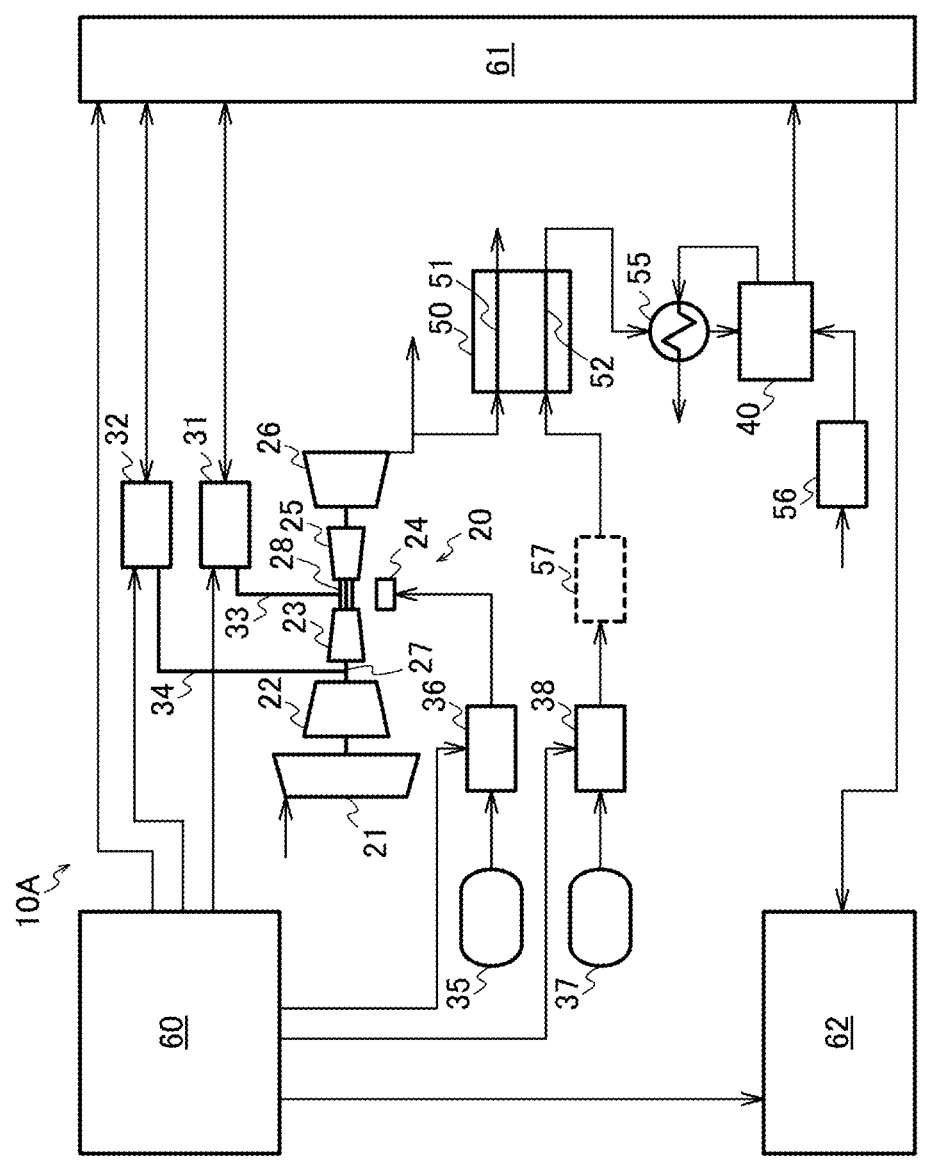

FIG. 4

| 20 | engine |
|----|--------|
| 21 | fan |
| 22 | low-pressure compressor |
| 23 | high-pressure compressor |
| 24 | combustion chamber |
| 25 | high-pressure turbine |
| 26 | low-pressure turbine |
| 27 | low-pressure shaft |
| 28 | high-pressure shaft |
| 31 | first motor generator |
| 32 | second motor generator |
| 33 | first drive train |
| 34 | second drive train |
| 35 | fuel tank |
| 36 | fuel supply device |
| 37 | raw material tank |
| 38 | raw material supply device |
| 40 | fuel cell |
| 50 | fuel gas generator |
| 51 | heat-medium channel |
| 52 | reaction channel |
| 55 | heat exchanger |
| 57 | heating device |
| 60 | controller |
| 61 | controller |
| 62 | aircraft components |
| 70 | turbocharger |
| 71 | turbine |
| 72 | compressor |
| 73 | third motor generator |

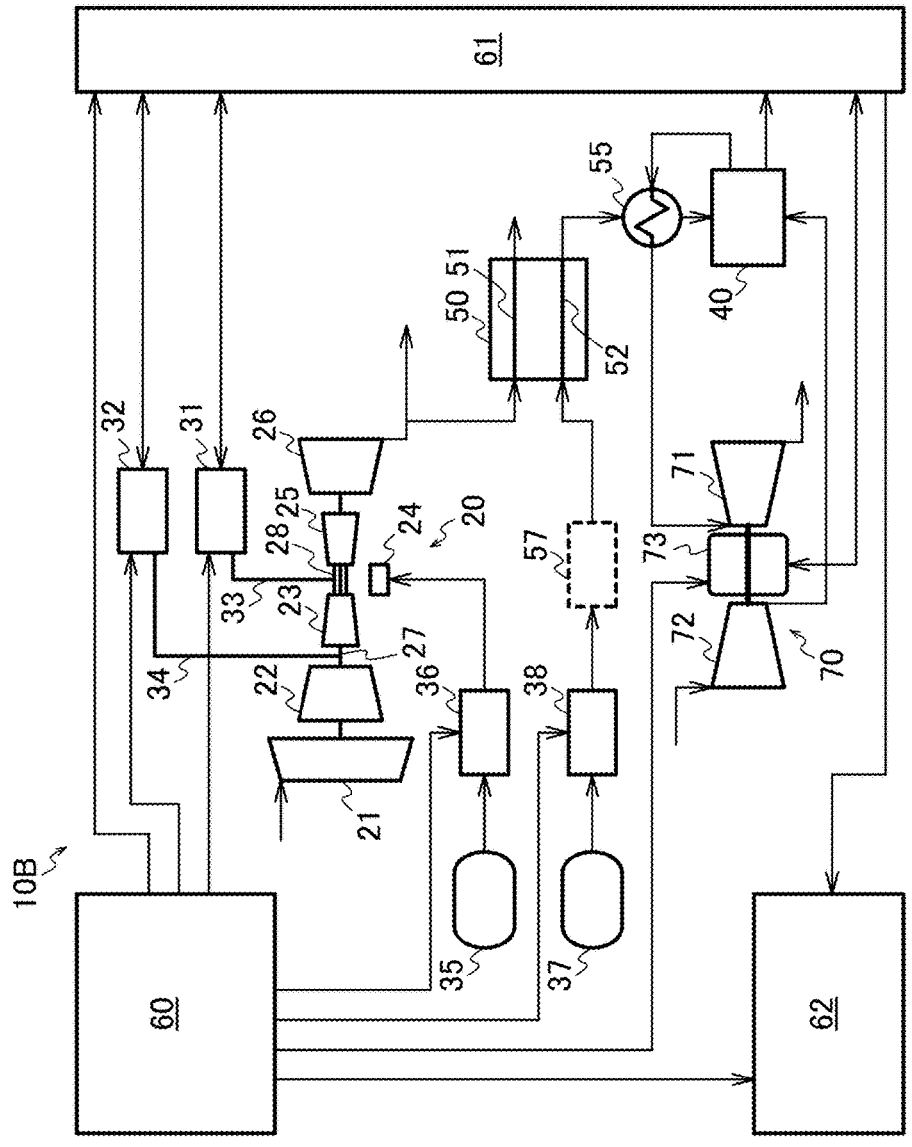

FIG. 5

* ST: stopped   OP: operating

| MODE / DEVICE | 1 GROUND STANDBY | 2-1 TAXIING | 2-2 TAXIING | 3-1 TAKEOFF | 3-2 TAKEOFF | 4 CRUISE | 5 DESCENT |
|---|---|---|---|---|---|---|---|
| ENGINE | ST | OP | ST | OP | OP | OP | OP |
| HIGH-PRESSURE SHAFT MG | ST | M | ST | M | ST | ST | M |
| LOW-PRESSURE SHAFT MG | ST | ST | M | OP | ST | G | G |
| FAN | ST | OP | OP | ST | ST | ST | OP |
| HEATING DEVICE | OP | ST | OP | ST | ST | ST | OP |
| FUEL GAS GENERATOR | OP | OP | OP | OP | OP | ST | OP |
| HEAT EXCHANGER | OP | OP | OP | OP | OP | ST | OP |
| FUEL CELL | OP | OP | OP | OP | OP | ST | OP |
| ELECTRIC TURBOCHARGER | OP | OP | OP | OP | OP | ST | OP |
| AIRCRAFT COMPONENTS | OP | OP | OP | OP | OP | OP | OP |

FIG. 6

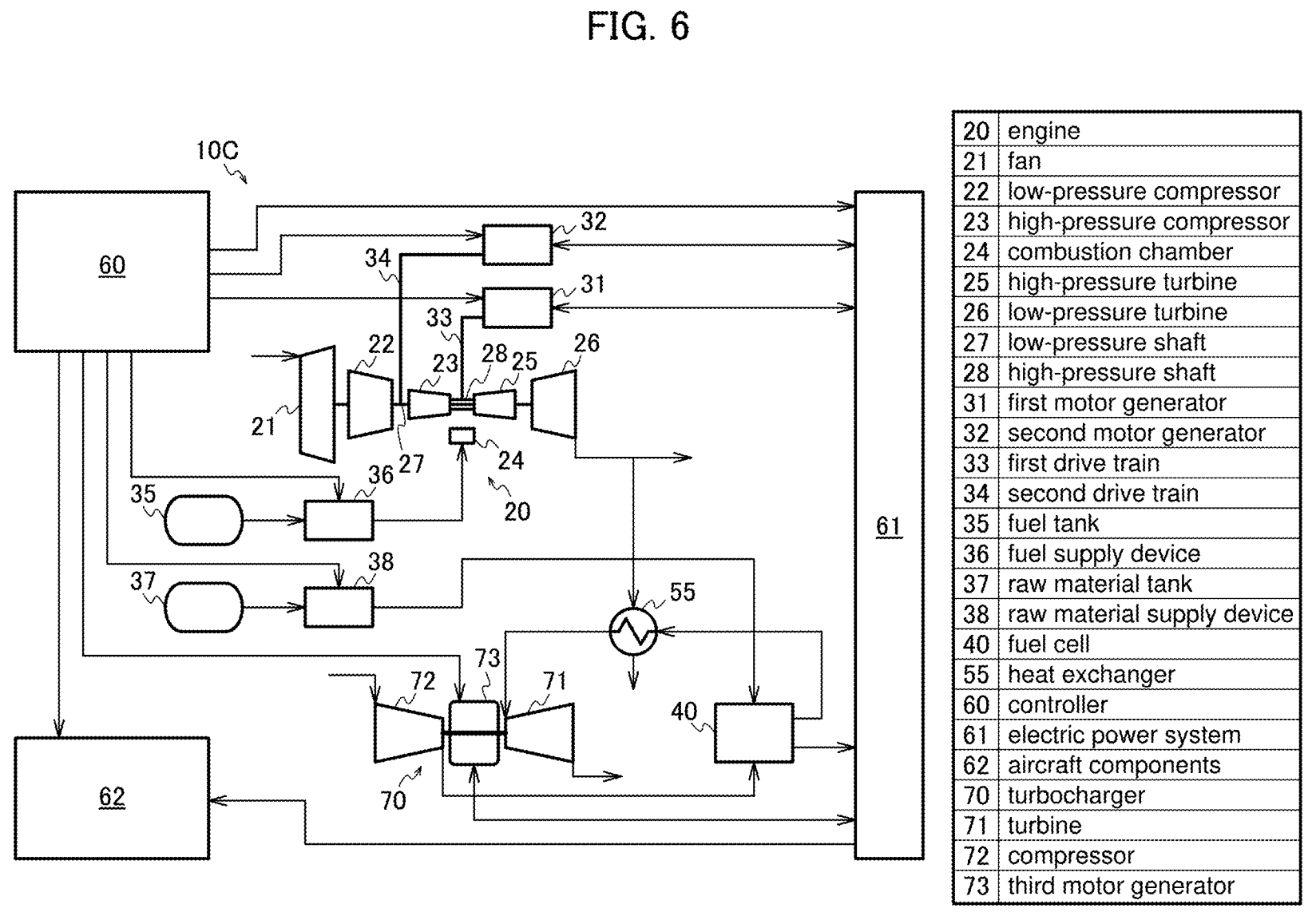

| 20 | engine |
|---|---|
| 21 | fan |
| 22 | low-pressure compressor |
| 23 | high-pressure compressor |
| 24 | combustion chamber |
| 25 | high-pressure turbine |
| 26 | low-pressure turbine |
| 27 | low-pressure shaft |
| 28 | high-pressure shaft |
| 31 | first motor generator |
| 32 | second motor generator |
| 33 | first drive train |
| 34 | second drive train |
| 35 | fuel tank |
| 36 | fuel supply device |
| 37 | raw material tank |
| 38 | raw material supply device |
| 40 | fuel cell |
| 55 | heat exchanger |
| 60 | controller |
| 61 | electric power system |
| 62 | aircraft components |
| 70 | turbocharger |
| 71 | turbine |
| 72 | compressor |
| 73 | third motor generator |

AIRCRAFT HYBRID MOTIVE POWER SOURCE SYSTEM AND METHOD FOR CONTROLLING SAME

CROSS REFERENCE TO RELATED APPLICATIONS

This application is a continuation application of International Application No. PCT/JP2023/025869, now WO 2024/018988 A1, filed on Jul. 13, 2023, which claims priority to Japanese Patent Application No. 2022-116250, filed on Jul. 21, 2022, the entire contents of which are incorporated by reference herein.

TECHNICAL FIELD

The present disclosure relates to an aircraft hybrid motive power source system in which a gas turbine engine and a fuel cell are used together as motive power sources for thrust.

BACKGROUND ART

A conventional gas turbine engine installed on an aircraft generates not only thrust of the aircraft but also electric power consumed by the aircraft by driving a generator.

In recent years, the demand for electric power in an aircraft has increased in accordance with the demand from the electrification of aircraft (MEA: More Electric Aircraft), etc. Therefore, in addition to the conventional power generation system using the extraction force from a high-pressure shaft, a power generation system using the extraction force from a low-pressure shaft has been proposed (see JP 2006-153013 A).

SUMMARY OF THE INVENTION

There are situations in which the thrust required for the propulsion fan is relatively low, such as taxiing or descending. Under such a situation, it is necessary to reduce the rotational speed of the gas turbine engine. However, in general, a gas turbine engine has a characteristic that thermal efficiency decreases in a low rotational speed range. Therefore, under the circumstances described above, thermal efficiency tends to decrease, and fuel economy deteriorates. Moreover, since the rotational speed decreases, the amount of power generated also decreases.

The present disclosure has been made in view of the circumstances described above, and it is an object of the present disclosure to provide an aircraft hybrid motive power source system and a method for controlling same, which are capable of improving fuel economy.

An aircraft hybrid motive power source system according to a first aspect of the present disclosure includes: a gas turbine engine mounted on an aircraft and including a low-pressure shaft and a high-pressure shaft as rotary shafts; a first motor generator drivingly connected to the high-pressure shaft; a second motor generator drivingly connected to the low-pressure shaft; a fuel cell to which a fuel gas and an oxidant gas are supplied; a fuel gas generator configured to generate the fuel gas from a raw material by heating using an exhaust gas from the gas turbine engine; and a controller configured to supply an electric power of the fuel cell obtained by a supply of the fuel gas to one of the first motor generator and the second motor generator, based on at least one of information indicating an operating status of the gas turbine engine and an electric power demand of the aircraft.

The aircraft hybrid motive power source system according to the first aspect, may further include: a heat exchanger configured to heat a discharged object of the fuel cell and cool the fuel gas supplied to the fuel cell by heat exchange between the fuel gas and the discharged object of the fuel cell; and a turbocharger configured to compress and supply the oxidant gas to the fuel cell by being supplied with the discharged object of the fuel cell. The aircraft hybrid motive power source system according to the first aspect, may further include a heating device configured to preheat the raw material supplied to the fuel gas generator.

An aircraft hybrid motive power source system according to a second aspect of the present disclosure includes: a gas turbine engine mounted on an aircraft and including a low pressure shaft and a high pressure shaft as rotary shafts; a first motor generator drivingly connected to the high pressure shaft; a second motor generator drivingly connected to the low pressure shaft; a fuel cell to which a fuel gas and an oxidant gas are supplied; a heat exchanger configured to heat a discharged object of the fuel cell by heat exchange between an exhaust gas from the gas turbine engine and the discharged object of the fuel cell; a turbocharger configured to compress and supply the oxidant gas to the fuel cell by being supplied with the discharged object of the fuel cell heated by the heat exchanger; a controller configured to supply an electric power of the fuel cell obtained by a supply of the fuel gas to one of the first motor generator and the second motor generator, based on at least one of information indicating an operating status of the gas turbine engine and an electric power demand of the aircraft.

The turbocharger according to the first or second aspect may be an electric turbocharger having a third motor generator. In this case, the controller supplies an electric power of the electric turbocharger obtained by being supplied with the discharged object of the fuel cell to one of the first motor generator and the second motor generator based on at least one of the information indicating the operating status of the gas turbine engine and the electric power demand of the aircraft.

A method for controlling an aircraft hybrid motive power source system according to a third aspect of the present disclosure includes: generating a fuel gas for a fuel cell from a raw material by heating using an exhaust gas from a gas turbine engine which is mounted on an aircraft and includes a low pressure shaft and a high pressure shaft as rotary shafts; supplying the fuel gas to the fuel cell; and supplying an electric power of the fuel cell obtained by a supply of the fuel gas to one of a first motor generator drivingly connected to the high pressure shaft and a second motor generator drivingly connected to the low pressure shaft, based on at least one of information indicating an operating status of the gas turbine engine and an electric power demand of the aircraft.

The controlling method according to the third aspect may further include: heating a discharged object of the fuel cell and cooling the fuel gas supplied to the fuel cell by heat exchange between the fuel gas and the discharged object of the fuel cell; and compressing and supplying an oxidant gas of the fuel cell from a compressor of a turbocharger to the fuel cell by supplying the heated discharged object of the fuel cell to a turbine of the turbocharger. The controlling method according to the third aspect may further include heating the raw material before generating the fuel gas from the raw material.

A method for controlling an aircraft hybrid motive power source system according to a fourth aspect of the present disclosure includes: pressurizing a discharged object of a fuel cell by heating using heat exchange between the discharged object of the fuel cell and an exhaust gas from a gas turbine engine which is mounted on an aircraft and includes a low pressure shaft and a high pressure shaft as rotary shafts; supplying the pressurized discharged object of the fuel cell to a turbine of a turbocharger; supplying a fuel gas discharged from a compressor of the turbocharger to the fuel cell; and supplying an electric power of the fuel cell obtained by a supply of the fuel gas to one of a first motor generator drivingly connected to the high pressure shaft and a second motor generator drivingly connected to the low pressure shaft, based on at least one of information indicating an operating status of the gas turbine engine and an electric power demand of the aircraft.

The turbocharger according to the third or fourth aspect may be an electric turbocharger having a third motor generator. In this case, an electric power of the electric turbocharger obtained by being supplied with the discharged object of the fuel cell is supplied to one of the first motor generator and the second motor generator.

According to the present disclosure, it is possible to provide an aircraft hybrid motive power source system and a method for controlling same, which are capable of improving fuel economy.

BRIEF DESCRIPTION OF THE DRAWINGS

FIG. 1 is a block diagram showing a configuration of a hybrid system according to a first embodiment of the present disclosure.

FIG. 4 is a block diagram showing a configuration of a hybrid system according to a modification of a first embodiment of the present disclosure.

FIG. 5 is a diagram showing an operation state of each device in an exemplary operation mode of a hybrid system according to each embodiment of the present disclosure.

FIG. 6 is a block diagram showing a configuration of a hybrid system according to a second embodiment of the present disclosure.

DESCRIPTION OF EMBODIMENTS

Figures 2, 3:
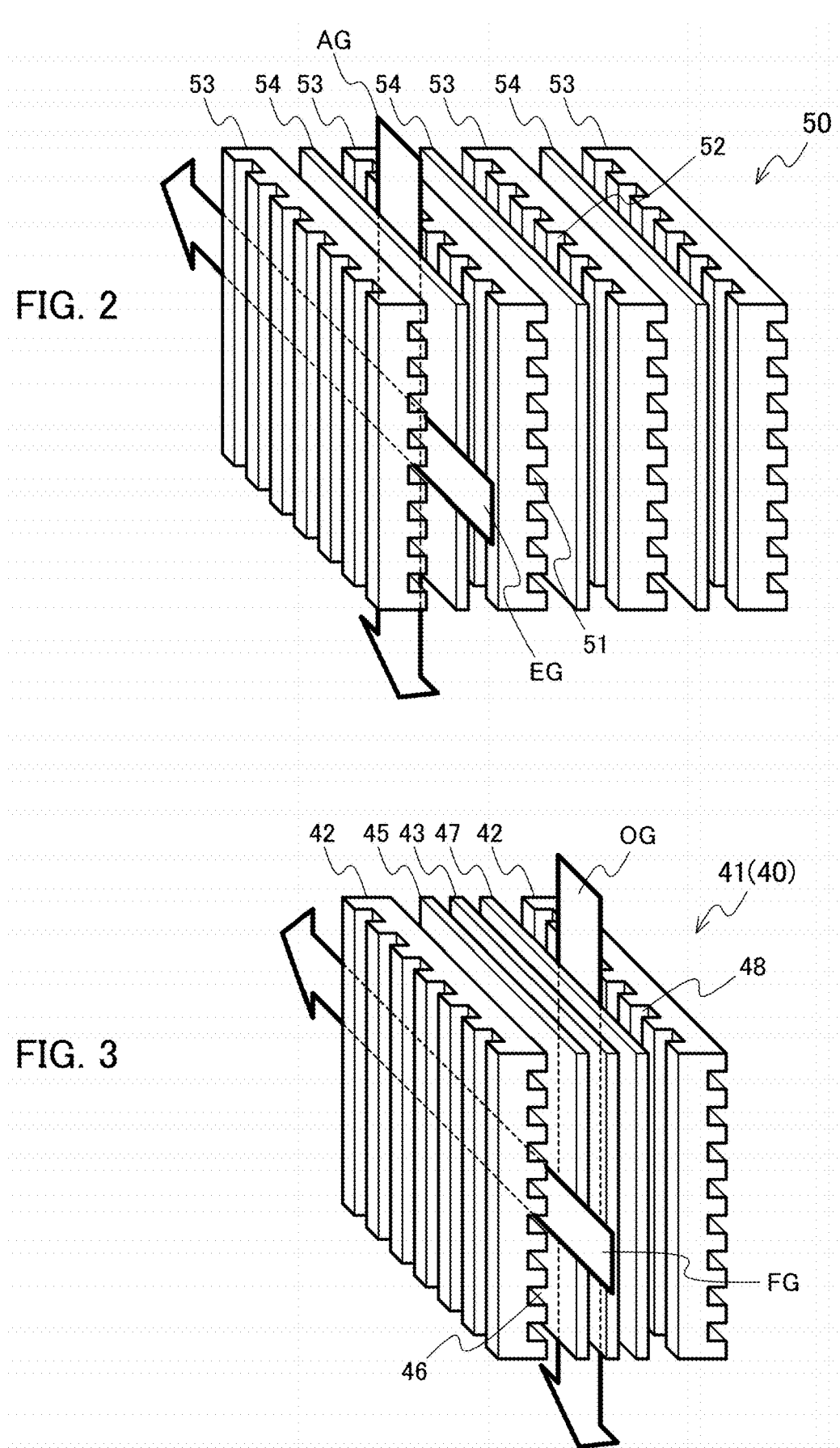
FIG. 2 is a perspective view showing a configuration of a unit cell of a fuel cell according to each embodiment of the present disclosure.
FIG. 3 is a perspective view showing a main part of a fuel gas generator according to a first embodiment of the present disclosure.

Hereinafter, several embodiments of the present disclosure will be described. It should be noted that the same reference numerals are given to the common parts in the figures, and explanations to be duplicated will be omitted. The aircraft hybrid motive power source system according to the present embodiment includes at least a gas turbine engine for aircraft, a fuel cell, and a controller. These are installed in an aircraft (not shown).

The aircraft hybrid motive power source system utilizes the exhaust heat of the gas turbine engine for power generation of the fuel cell, and supplies the electric power obtained thereby to each device of the aircraft depending on the operating status of the aircraft. The devices to each of which the electric power of the fuel cell is supplied include a motor generator that is drivingly connected to the rotary shaft of the gas turbine engine. In other words, the electric power of the fuel cell is used not only as electric power for avionics, air conditioner and the like, but also as a motive power to assist the gas turbine engine.

For convenience of explanation, the aircraft hybrid motive power source system is simply referred to as a hybrid system, and the gas turbine engine is simply referred to as an engine. Examples of the engine according to the present embodiment include a turbofan engine, a turbojet engine, a turboprop engine, a turboshaft engine, and the like. As will be described later, the engine includes a low-pressure shaft as a rotary shaft for connecting the low-pressure compressor and the low-pressure turbine, and a high-pressure shaft as a rotary shaft for connecting the high-pressure compressor and the high-pressure turbine. That is, the engine according to the present embodiment is a multi-axis gas turbine engine.

First Embodiment

A first embodiment of the present disclosure will be described. The hybrid system 10A according to the present embodiment generates fuel gas for a fuel cell using the heat of exhaust gas from the engine. The fuel cell generates electric power by the fuel gas supplied thereto. Further, the hybrid system 10A uses the electric power obtained from the fuel cell as electric assist of the engine or power of the electric equipment according to the operating status of the aircraft. As a result, it is possible to improve the thermal efficiency of the gas turbine engine, improve fuel efficiency, reduce carbon emissions and the like.

FIG. 1 is a block diagram showing a configuration of a hybrid system 10A according to the present embodiment. As shown in FIG. 1, the hybrid system 10A includes an engine 20, a first motor generator 31, a second motor generator 32, a fuel cell 40, a fuel gas generator 50, and a controller 60. These components are installed in an aircraft (not shown).

First, the engine will be described. The configuration of the engine 20 according to the present embodiment is basically same as that of a conventional turbofan engine. That is, the engine 20 is a two-shaft turbofan engine and includes a fan 21, a low-pressure compressor 22, a high-pressure compressor 23, a combustion chamber 24, a high-pressure turbine 25, and a low-pressure turbine 26. The low-pressure compressor 22, the low-pressure turbine 26, and the fan 21 are connected to each other via a low-pressure shaft (low-pressure spool) 27 as a rotary shaft. The fan 21 may be connected to the low-pressure shaft 27 via gears (not shown). The high-pressure compressor 23 and the high-pressure turbine 25 are connected to each other via a high-pressure shaft (high-pressure spool) 28 as a rotary shaft.

The basic operations (e.g., gas compression, combustion, conversion of pressure energy to kinetic (rotational) energy, etc.) of the engine 20 are also the same as those of a conventional engine. That is, the fan 21 takes in gas as a working fluid from the front of the fan 21 and discharges it to the rear of the fan 21. A part of the gas that has passed through the fan 21 flows into the low-pressure compressor 22. The low-pressure compressor 22 compresses the gas that has flowed in from the fan 21 and discharges it to the high-pressure compressor 23. The high-pressure compressor 23 further compresses the gas having been compressed by the low-pressure compressor 22 and supplies it to the combustion chamber 24.

The combustion chamber 24 combusts a mixed gas of the gas compressed by the high-pressure compressor 23 and the fuel supplied from the fuel tank 35 through the fuel supply device 36. The amount of fuel supplied is set by the controller 60. The fuel supply device 36 supplies the amount of fuel based on the set value to the combustion chamber 24. The combustion gas is discharged to the high-pressure turbine 25 and rotates the high-pressure turbine 25 with being expanding while it passes through the high-pressure turbine 25. This rotational energy is transmitted to the high-pressure compressor 23 via the high-pressure shaft 28, and thereby rotates the high-pressure compressor 23.

The combustion gas passing through the high-pressure turbine 25 further expands while it passes through the low-pressure turbine 26, and rotates the low-pressure turbine 26. This rotational energy is transmitted to the low-pressure compressor 22 and the fan 21 via the low-pressure shaft 27, and thereby rotates the low-pressure compressor 22 and the fan 21. Part of the combustion gas passing through the low-pressure turbine 26 is supplied to a fuel gas generator 50 described later, and the remainder is discharged to the outside of the engine 20.

The first motor generator (high-pressure shaft MG) 31 is drivingly connected to the high-pressure shaft 28 via the first drive train 33. That is, when the first motor generator 31 operates as a generator, a part of the rotational energy of the high-pressure shaft 28 is transmitted to the first motor generator 31 via the first drive train 33. Alternatively, when the first motor generator 31 operates as a motor, the rotational energy of the first motor generator 31 is transmitted to the high-pressure shaft 28 via the first drive train 33.

The second motor generator (low-pressure shaft MG) 32 is drivingly connected to the low-pressure shaft 27 via the second drive train 34. That is, when the second motor generator 32 operates as a generator, a part of the rotational energy of the low-pressure shaft 27 is transmitted to the second motor generator 32 via the second drive train 34. Alternatively, when the second motor generator 32 operates as a motor, the rotational energy of the second motor generator 32 is transmitted to the low-pressure shaft 27 via the second drive train 34.

The first motor generator 31 and the second motor generator 32 are accommodated, for example, in a well-known accessory gearbox (AGB, not shown) together with auxiliaries such as a fuel pump, a starter and the like. However, the location where these are accommodated is not limited to the AGB. For example, the second motor generator 32 may be accommodated in a tail cone (not shown). In this case, the second motor generator 32 is drivingly connected to the rear end of the low-pressure shaft 27.

The engine 20 according to the present embodiment may be a three-axis gas turbine engine further comprising an intermediate-pressure compressor (not shown), an intermediate-pressure turbine (not shown), and an intermediate-pressure shaft (medium-pressure spool, not shown) serving as a rotary shaft for connecting them. In this case, a motor generator (not shown) may also be drivingly connected to the medium-pressure shaft. The motor generator drivingly connected to the medium-pressure shaft also operates as a motor or generator based on at least one of information indicating the operating status of the engine 20 and the electric power demand of the aircraft.

Next, a fuel gas generator will be described. The fuel gas generator 50 according to the present embodiment generates fuel gas for the fuel cell 40 from a raw material by heating using exhaust gas from the engine 20. The raw material is, for example, ammonia. Since the hydrogen density per volume of ammonia is greater than that of hydrogen, it is suitable for storage in an aircraft subject to spatial limitations.

The raw material is stored in the raw material tank 37 in a liquid state. The raw material is supplied to the fuel gas generator 50 by the raw material supply device 38. The raw material supply device 38 includes a pump such as a gear pump capable of adjusting the discharge amount. The amount of raw material supplied by the raw material supply device 38 is set by the controller 60. The raw material supply device 38 supplies the amount of raw material based on the set value to the fuel gas generator 50.

An example of the configuration of the fuel gas generator 50 will be described. FIG. 2 is a perspective view showing an example of a main part of the fuel gas generator 50. The fuel gas generator 50 is a so-called reformer or catalytic reactor. As shown in FIG. 2, the fuel gas generator 50 includes, for example, a heat-medium channel 51 and a reaction channel 52. The heat-medium channel 51 and the reaction channel 52 are formed on, for example, one side surface and the other side surface of the plate member 53, respectively. The plate member 53 and the partition wall 54 are formed of a material having high thermal conductivity, such as metal, and are alternately stacked. Therefore, the heat-medium channel 51 and the reaction channel 52 are thermally coupled to each other through the plate member 53 or the partition wall 54.

An inlet (upstream side) of the heat-medium channel 51 is connected to a duct (not shown) of the engine 20. An outlet (downstream side) of the heat-medium channel 51 is connected to a pipe (not shown) leading to the outside of the engine 20. On the other hand, an inlet (upstream side) of the reaction channel 52 is connected to an outlet of the raw material supply device 38. An outlet (downstream side) of the reaction channel 52 is connected to a primary inlet of the heat exchanger 55.

A packing (not shown) carrying a catalyst is provided in the reaction channel 52. Alternatively, the catalyst may be carried on the inner surface of the reaction channel 52. The catalyst includes a component that promotes the hydrogen production reaction at relatively high temperatures (e.g., 300° C. to 900° C.). When the raw material is ammonia, the catalyst may be nickel or ruthenium, or other metals or alloys.

The exhaust gas EG of the engine 20 is supplied to the heat-medium channel 51. By supplying the exhaust gas, the fuel gas generator 50 is heated to about 450° C. or higher, which is the operating temperature (light-off temperature) of the catalyst. When ammonia gas AG as a raw material is supplied to the reaction channel 52 in this state, a mixed gas of hydrogen and nitrogen is generated by the catalytic reaction. This mixed gas is used as the fuel gas of the fuel cell 40.

The temperature of the fuel gas immediately after it is generated by the fuel gas generator 50 is several hundred degrees Celsius. This temperature is higher than the operating temperature (e.g., 70° C. to 90° C.) of the fuel cell 40 assumed in the present embodiment. Therefore, in the present embodiment, the fuel gas is supplied to the fuel cell 40 after being cooled by the heat exchanger 55.

As described above, the primary inlet of the heat exchanger 55 is connected to the outlet of the reaction channel 52 in the fuel gas generator 50. The primary outlet of the heat exchanger 55 is connected to the inlet of the first channel 46 in the fuel cell 40. The secondary inlet of the heat exchanger 55 is connected to the outlet of the second channel 48 in the fuel cell 40. The secondary outlet of the heat exchanger 55 is connected to a pipe (not shown) leading to the outside of the engine 20.

Fuel gas flows through the primary side of the heat exchanger 55. On the other hand, steam, which is a discharged object of the fuel cell 40, flows through the secondary side of the heat exchanger 55. As a result, heat is exchanged between the fuel gas and steam, and the fuel gas is cooled, while the steam is heated and discharged to the outside of the engine 20.

It should be noted that when a fuel cell having a relatively high operating temperature, in other words, an operating temperature close to the temperature of the fuel gas, is employed, the heat exchanger 55 may be omitted.

Next, a fuel cell will be described. The fuel cell 40 according to the present embodiment is a polymer electrolyte fuel cell (PEFC). As is known, the PEFC generates electric power by the reaction between hydrogen and oxygen. Here, hydrogen is a component of the fuel gas, and oxygen is a component of the oxidant gas. The fuel cell according to the present embodiment is required to respond quickly (i.e., within a few seconds) to the set power value requested by the controller 60. The PEFC is an example of a fuel cell that satisfies such output performance. As long as the response performance described above can be obtained, the fuel cell 40 may be a fuel cell other than the PEFC.

FIG. 3 is a perspective view showing the configuration of the unit cell 41 of the fuel cell 40 according to the present embodiment. As shown in this figure, the fuel cell 40 has separators 42 and unit cells 41. The separators 42 and the unit cells 41 are stacked alternately.

The unit cell 41 includes an electrolyte membrane 43, an anode 45 as a fuel electrode, and a cathode 47 as an oxygen electrode (air electrode). The electrolyte membrane 43 is located between the anode 45 and the cathode 47. The electrolyte membrane 43 is a solid polymer membrane having cation conductivity, for example, a hydrocarbon polymer electrolyte membrane.

The anode 45 and the cathode 47 are electrodes formed of a porous material carrying a catalyst. The porous material is, for example, carbon. The catalyst is, for example, platinum or an alloy containing platinum.

Each separator 42 is a plate member arranged in parallel with the unit cell 41, and is a wall which separates adjacent unit cells 41. The separator 42 is formed of metal, carbon, conductive plastic, or the like. The separator 42 includes a first channel 46 through which the fuel gas FG flows on a surface in contact with the anode 45. The separator 42 also includes a second channel 48 through which the oxidant gas OG flows on a surface in contact with the cathode 47.

The first channel 46 is formed, for example, of grooves extending in a predetermined direction. An inlet (upstream side) of the first channel 46 is connected to an outlet on the primary side of the heat exchanger 55. An outlet (downstream side) of the first channel 46 is connected to a pipe (not shown) leading to the outside of the engine 20.

The second channel 48 is formed, for example, of grooves extending in a predetermined direction. An inlet (upstream side) of the second channel 48 is connected to an outlet of an air supplier 56, such as a pump or blower. An outlet (downstream side) of the second channel 48 is connected to a secondary inlet of the heat exchanger 55. It should be noted that the second channel 48 also functions as a discharge passage for discharge (i.e., water) generated in accordance with the generation of electric power by the fuel cell 40. That is, the discharged object from the fuel cell 40 is supplied to the secondary side of the heat exchanger 55.

When hydrogen as a fuel gas is supplied to the first channel 46 and air containing oxygen as an oxidant gas is supplied to the second channel 48, the fuel cell 40 generates electric power by a well-known chemical reaction. Water as a reaction product is discharged from the second channel 48 of the fuel cell 40. This water is supplied to the secondary side of the heat exchanger 55 and is used for cooling the fuel gas.

The fuel gas, which is supplied from the fuel gas generator 50, contains nitrogen gas. However, the nitrogen gas does not affect a series of chemical reactions in the fuel cell 40, or its influence is extremely small. Therefore, in the present embodiment, a device for separating the nitrogen gas from the fuel gas can be omitted.

In accordance with an operating status of the aircraft, the electric power generated by the fuel cell 40 is distributed via the electric power system (power supply system) 61 to the equipment requiring electric power in that status. An example of this equipment is, for example, the first motor generator (high-voltage shaft MG) 31 described above. The details will be described later.

Next, the controller will be described. The controller 60 according to the present embodiment is configured as a computer linked with FADEC (Full Authority Digital Engine Control). The controller 60 calculates the amount of electric power supply for the aircraft components 62 based on at least one of information indicating the operating status of the engine 20 (hereinafter referred to as operation status information) and the electric power demand of the aircraft, and supplies the electric power with the calculated amount to the aircraft components 62 via the electric power system 61.

The operating status information of the engine 20 represents measured values of a pressure sensor, a temperature sensor, a flow sensor, etc., mounted on the engine 20, an outside temperature, an altitude, a flow rate of jet fuel supplied to the engine 20, a set value of an operation mode corresponding to an angular position of a power lever (i.e., PLA), etc. The electric power demand of the aircraft represents the electric power required for various types of aircraft components 62 such as avionics and air conditioning. The above-mentioned information and electric power demand changes every moment due to changes in operation modes and changes in the environment outside the aircraft.

The aircraft components 62 includes the first motor generator 31 and the second motor generator 32. That is, the controller 60 supplies the electric power of the fuel cell 40 obtained by the supply of fuel gas to one of the first motor generator 31 and the second motor generator 32, based on at least one of the operation status information of the engine 20 and the electric power demand of the aircraft, and assists in driving them.

The electric power obtained from the power generating equipment including the first motor generator 31, the second motor generator 32, and the fuel cell 40 is transmitted to the electric power system 61. The electric power system 61 is composed of various switches, relays, bus bars, etc., and functions as equipment for supplying and distributing electric power. The electric power system 61 is controlled by the controller 60, and supplies the electric power obtained from the power generating equipment to the aircraft components 62 such as avionics and air conditioning, or to the first motor generator 31 or the second motor generator 32 required to operate as an electric motor.

A modification of the first embodiment will be described. FIG. 4 is a block diagram of a hybrid system 10B according to a modification of the first embodiment. As shown in this figure, the hybrid system 10B according to the present modification may include a turbocharger 70. In this case, the air supplier 56 connected to the second channel 48 of the fuel cell 40 is omitted. From another perspective, the air supplier 56 can be said to operate as a compressor 72 of the turbocharger 70.

The turbocharger 70 includes a turbine 71 and a compressor 72 that rotates integrally with the turbine 71. An inlet of the turbine 71 is connected to the outlet on the secondary side of the heat exchanger 55. An outlet of the turbine 71 is also connected to, for example, an exhaust pipe (not shown) leading to the outside of the engine 20. The inlet of the compressor 72 is connected to, for example, an intake pipe (not shown) leading to the outside of the engine 20. The outlet of the compressor 72 is connected to the inlet (upstream side) of the second channel of the fuel cell 40.

As described above, the inlet of the turbine 71 is connected to the outlet on the secondary side of the heat exchanger 55. Accordingly, the discharged object (i.e., water) of the fuel cell 40 that has passed through the heat exchanger 55 becomes steam, which is pressurized by heating in the heat exchanger 55, and flows into the turbine 71. The steam rotates the turbine 71, and the compressor 72 also rotates with this rotation.

The compressor 72 in operation takes in and compresses air as oxidant gas. The compressed air is discharged from the compressor 72 and flows into the second channel 48 of the fuel cell 40. That is, the turbocharger 70 compresses and supplies the oxidant gas to the fuel cell 40 by being supplied with the discharged object of the fuel cell 40 having been heated by the heat exchanger 55. This promotes the generation of electric power by the fuel cell 40 and increases the amount of electric power obtained.

The turbocharger 70 may be an electric turbocharger including a third motor generator 73. In this case, power can also be obtained from the third motor generator 73 by rotation of the turbine 71 due to supply of steam. Therefore, the total amount of power to be obtained increases. The controller 60 may supply the power obtained from the third motor generator 73 to one of the first motor generator 31 and the second motor generator 32 based on at least one of the operating status information of the engine 20 and the electric power demand of the aircraft.

The hybrid system 10A (10B) may further include a heating device 57. The heating device 57 includes a well-known configuration including a combustor or an electric heater. The heating device 57 preheats the raw material supplied to the fuel gas generator 50. The raw material is heated to a temperature at which the catalytic reaction proceeds without receiving heat from the heat-medium channel 51 in the reaction channel 52 of the fuel gas generator 50. The raw material heated to this temperature is decomposed into fuel gas in the reaction channel 52 and supplied to the fuel cell 40.

Next, several examples of control by the hybrid system according to the present embodiment will be described. FIG. 5 is a diagram showing the operation states of devices in an example of the operation modes of the hybrid system according to the present embodiment. In each operation mode, the power generation source and the device mainly receiving the power are indicated by arrows. The high-pressure shaft MG refers to the first motor generator 31, and the low-pressure shaft MG refers to the second motor generator 32. "M" in the frame means that the motor generator is operating as a motor, and "G" in the frame means that the motor generator is operating as a generator. It is also assumed that the turbocharger 70 in this example is an electric turbocharger and includes a third motor generator.

In any operation mode, the controller 60 acquires, as needed, the operating status information of the engine 20 and the electric power demand of the aircraft. The controller 60 also acquires in advance the maximum amount of electric power that can be generated by the second motor generator 32. When the second motor generator 32 operates as a generator, the controller 60 sets the amount of electric power generated by the second motor generator 32 within the range of the above-described maximum amount of electric power, and sets the amount of raw material supplied by the raw material supply device 38 and the amount of oxidant gas supplied by the air supplier 56 (or the turbocharger 70). That is, the controller 60 sets the distribution of the amount of power generated by the second motor generator 32 and the amount of power generated by the fuel cell 40.

1. Ground Standby (Idle) Mode

In this mode, an aircraft is in a state of waiting in an airport, and the aircraft is stopped at a predetermined place. In this mode, combustion in the engine 20 is stopped. Therefore, rotation of the low-pressure shaft 27 and the high-pressure shaft 28 by combustion gas is also stopped. In this mode, all of the aircraft components 62 is powered by the electric power of the fuel cell 40, and jet fuel is not consumed. Therefore, the consumption of jet fuel can be reduced. In other words, the carbon emission can be reduced.

For example, the raw material supply device 38 and the heating device 57 are operated, and a raw material with high temperature is supplied to the reaction channel 52 of the fuel gas generator 50. While the raw material flows through the reaction channel 52, the reaction channel 52 is heated, and the temperature in the reaction channel 52 reaches the operating temperature of the catalyst. As a result, the catalytic reaction proceeds, and the fuel gas for the fuel cell 40 is generated from the raw material. The generated fuel gas is cooled by the heat exchanger and supplied to the first channel 46 of the fuel cell 40.

On the other hand, the turbocharger 70 also operates by receiving the electric power from the fuel cell 40, and the air, which is the oxidant gas, is compressed and supplied to the second channel 48 of the fuel cell 40. In the fuel cell 40, electric power is generated by being supplied with the fuel gas and the oxidant gas. The generated electric power is transmitted to the electric power system 61, and is supplied to the equipment requiring electric power in this operation mode under the control of the controller 60.

2-1. First Taxiing Mode

In this mode, the aircraft is taxiing in an airport. In order to obtain the minimum thrust required, the engine 20 starts combustion of jet fuel and rotates the fan 21. However, since the engine 20 operates in a low-speed range, thermal efficiency is low. Therefore, the electric power of the fuel cell 40 is supplied to the first motor generator (high-pressure shaft MG) 31 to assist the rotation of the high-pressure shaft 28. This increases the compression ratio of the working fluid in the high-pressure compressor 23, thereby improving thermal efficiency.

In this mode, part of the exhaust gas from the engine 20 flows into the heat-medium channel 51 of the fuel gas generator 50, and the heat-medium channel 51 and the reaction channel 52 are heated to a temperature equal to or higher than the operating temperature of the catalyst. The amount of raw material set by the control unit 60 is supplied from the raw material supply device 38 to the heated reaction channel 52, thereby generating a desired amount of fuel gas.

As in the ground standby mode, the turbocharger 70 operates also in the taxiing mode. Accordingly, electric power is generated in the fuel cell 40, and a part of the generated electric power is supplied to the first motor generator (high-voltage shaft MG) 31. The other part of the generated electric power is supplied to the aircraft components 62.

2-2. Second Taxiing Mode

In this mode, an aircraft is taxiing in an airport. However, unlike the first taxiing mode described above, operation of the engine 20 by combustion is stopped. Instead, the heating device 57 and the turbocharger 70 operate to generate electric power for the fuel cell 40. The electric power of the fuel cell 40 is supplied to a second motor generator (low-pressure shaft MG) 32, and the second motor generator 32 operates as an electric motor. As a result, the low-pressure shaft 27 rotates, and the fan 21 rotates. That is, thrust for taxiing is obtained. Since jet fuel is not consumed, the consumption of jet fuel can be reduced. In other words, fuel economy can be improved.

3-1. First Takeoff Mode

In this mode, the thrust obtained by the engine 20 is maximized. The electric power of the fuel cell 40 is supplied to the first motor generator 31, and the first motor generator 31 assists the rotation of the high-pressure shaft 28. By assisting the first motor generator 31, the temperature of the combustion gas at the inlet of the high-pressure turbine 25 is lowered, thereby extending the life of the high-pressure turbine 25.

3-2. Second Takeoff Mode

As in the first takeoff mode, the thrust obtained by the engine 20 is maximized in this mode. However, unlike the first take-off mode, the electric power of the fuel cell 40 is supplied to the aircraft components 62 and not to the first motor generator 31.

4. Cruise Mode

In this mode, the thermal efficiency of the engine 20 becomes highest, and the second motor generator 32 can be used as a generator. Since the aircraft components 62 can be supplied with the electric power of the second motor generator 32, all the devices for operating the fuel cell 40 and the fuel cell 40 are stopped.

5. Descent Mode

In this mode, the output and thrust of the engine 20 are reduced. Since the engine 20 operates in a low-speed range, the thermal efficiency deteriorates if left as is. In this mode, the fuel cell 40 is operated and its electric power is supplied to the first motor generator 31. Further, the second motor generator is operated as a generator and its electric power is also supplied to the first motor generator 31. As a result, thermal efficiency can be improved and fuel economy can be improved.

Second Embodiment

A second embodiment of the present disclosure will be described. FIG. 6 is a block diagram showing a configuration of a hybrid system 10C according to the second embodiment. The hybrid system 10C uses the heat of the exhaust gas of the engine 20 to heat the discharged object of the fuel cell 40. Therefore, as shown in FIG. 6, the exhaust gas of the engine 20 is supplied to the primary inlet of the heat exchanger 55. Further, the fuel gas generator 50 according to the first embodiment is omitted, and hydrogen gas as the fuel gas is supplied directly to the first channel 46 of the fuel cell 40. Other configurations are the same as those of the first embodiment, and operate in the same manner as in the first embodiment. Therefore, the same effects as in the first embodiment can be obtained.

In each of the above-described embodiments, the gas turbine engine and the fuel cell are used together as the motive power source of the thrust. The engine is assisted by the electric power of the fuel cell based on at least one of information indicating the operating status of the engine and the power demand of the aircraft. In order to generate the electric power of the fuel cell, the heat of exhaust gas from the engine 20, which until now has simply been discarded, is used. Therefore, the fuel economy can be improved. Also, carbon emissions can be reduced because carbon-free fuel is used as the fuel for generating thrust or power.

The present disclosure can contribute, for example, to Goal 7 of the Sustainable Development Goals "Ensure access to affordable, reliable and sustainable modern energy for all."

Also, the present disclosure is not limited to the embodiments described above, but is indicated by the claims and further includes all changes within the meaning and scope of the claims.

What is claimed is:

1. An aircraft hybrid motive power source system comprising:
   a gas turbine engine mounted on an aircraft and including a low-pressure shaft and a high-pressure shaft as rotary shafts;
   a first motor generator drivingly connected to the high-pressure shaft;
   a second motor generator drivingly connected to the low-pressure shaft;
   a fuel cell to which a fuel gas and an oxidant gas are supplied;
   a fuel gas generator configured to generate the fuel gas from a raw material by heating using an exhaust gas from the gas turbine engine; and
   a controller configured to supply an electric power of the fuel cell obtained by a supply of the fuel gas to one of the first motor generator and the second motor generator, based on at least one of information indicating an operating status of the gas turbine engine and an electric power demand of the aircraft.

2. The aircraft hybrid motive power source system according to claim 1, further comprising:
   a heat exchanger configured to heat a discharged object of the fuel cell and cool the fuel gas supplied to the fuel cell by heat exchange between the fuel gas and the discharged object of the fuel cell; and
   a turbocharger configured to compress and supply the oxidant gas to the fuel cell by being supplied with the discharged object of the fuel cell.

3. The aircraft hybrid motive power source system according to claim 2, wherein
   the turbocharger is an electric turbocharger having a third motor generator; and
   the controller supplies an electric power of the electric turbocharger obtained by being supplied with the discharged object of the fuel cell to one of the first motor generator and the second motor generator based on at least one of the information indicating the operating status of the gas turbine engine and the electric power demand of the aircraft.

4. The aircraft hybrid motive power source system according to claim 1, further comprising:
   a beating device configured to preheat the raw material supplied to the fuel gas generator.

5. An aircraft hybrid motive power source system comprising:

a gas turbine engine mounted on an aircraft and including a low pressure shaft and a high pressure shaft as rotary shafts;

a first motor generator drivingly connected to the high pressure shaft;

a second motor generator drivingly connected to the low pressure shaft;

a fuel cell to which a fuel gas and an oxidant gas are supplied;

a heat exchanger configured to heat a discharged object of the fuel cell by heat exchange between an exhaust gas from the gas turbine engine and the discharged object of the fuel cell;

a turbocharger configured to compress and supply the oxidant gas to the fuel cell by being supplied with the discharged object of the fuel cell heated by the heat exchanger; and a controller configured to supply an electric power of the fuel cell obtained by a supply of the fuel gas to one of the first motor generator and the second motor generator, based on at least one of information indicating an operating status of the gas turbine engine and an electric power demand of the aircraft.

6. The aircraft hybrid motive power source system according to claim 5, wherein the turbocharger is an electric turbocharger having a third motor generator; and the controller supplies an electric power of the electric turbocharger obtained by being supplied with the discharged object of the fuel cell to one of the first motor generator and the second motor generator based on at least one of the information indicating the operating status of the gas turbine engine and the electric power demand of the aircraft.

7. A method for controlling an aircraft hybrid motive power source system comprises:

generating a fuel gas for a fuel cell from a raw material by heating using an exhaust gas from a gas turbine engine which is mounted on an aircraft and includes a low pressure shaft and a high pressure shaft as rotary shafts;

supplying the fuel gas to the fuel cell; and supplying an electric power of the fuel cell obtained by a supply of the fuel gas to one of a first motor generator drivingly connected to the high pressure shaft and a second motor generator drivingly connected to the low pressure shaft, based on at least one of information indicating an operating status of the gas turbine engine and an electric power demand of the aircraft.

8. The method for controlling the aircraft hybrid motive power source system according to claim 7, comprising:

heating a discharged object of the fuel cell and cooling the fuel gas supplied to the fuel cell by heat exchange between the fuel gas and the discharged object of the fuel cell; and compressing and supplying an oxidant gas of the fuel cell from a compressor of a turbocharger to the fuel cell by supplying the heated discharged object of the fuel cell to a turbine of the turbocharger.

9. The method for controlling the aircraft hybrid motive power source system according to claim 8, wherein the turbocharger is an electric turbocharger having a third motor generator; and an electric power of the electric turbocharger obtained by being supplied with the discharged object of the fuel cell is supplied to one of the first motor generator and the second motor generator.

10. The method for controlling the aircraft hybrid motive power source system according to claim 7, comprising:

heating the raw material before generating the fuel gas from the raw material.

11. A method for controlling an aircraft hybrid motive power source system comprising:

pressurizing a discharged object of a fuel cell by heating using heat exchange between the discharged object of the fuel cell and an exhaust gas from a gas turbine engine which is mounted on an aircraft and includes a low pressure shaft and a high pressure shaft as rotary shafts;

supplying the pressurized discharged object of the fuel cell to a turbine of a turbocharger;

supplying a fuel gas discharged from a compressor of the turbocharger to the fuel cell; and supplying an electric power of the fuel cell obtained by a supply of the fuel gas to one of a first motor generator drivingly connected to the high pressure shaft and a second motor generator drivingly connected to the low pressure shaft, based on at least one of information indicating an operating status of the gas turbine engine and an electric power demand of the aircraft.

12. The method for controlling the aircraft hybrid motive power source system according to claim 11, wherein the turbocharger is an electric turbocharger having a third motor generator; and an electric power of the electric turbocharger obtained by being supplied with the discharged object of the fuel cell is supplied to one of the first motor generator and the second motor generator.

* * * * *